(12) United States Patent
Kasuya et al.

(10) Patent No.: US 12,145,564 B2
(45) Date of Patent: Nov. 19, 2024

(54) VEHICLE CONTROL DEVICE

(71) Applicant: HONDA MOTOR CO., LTD., Tokyo (JP)

(72) Inventors: Kentaro Kasuya, Tokyo (JP); Ryo Koyama, Tokyo (JP); Tomohiro Hosono, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/365,332

(22) Filed: Aug. 4, 2023

(65) Prior Publication Data
US 2024/0042979 A1    Feb. 8, 2024

(30) Foreign Application Priority Data

Aug. 8, 2022   (JP) .................... 2022-126600

(51) Int. Cl.
*B60T 8/58* (2006.01)
*B60T 7/22* (2006.01)
*B60W 30/09* (2012.01)

(52) U.S. Cl.
CPC ................... *B60T 8/58* (2013.01); *B60T 7/22* (2013.01); *B60T 2201/022* (2013.01); *B60T 2210/32* (2013.01); *B60T 2220/00* (2013.01); *B60T 2250/04* (2013.01); *B60W 30/09* (2013.01); *B60W 2710/207* (2013.01)

(58) Field of Classification Search
CPC ........ B60T 8/58; B60T 7/22; B60T 2201/022; B60T 2210/32; B60T 2220/00; B60T 2250/04; B60T 7/12; B60W 30/09; B60W 2710/207
See application file for complete search history.

(56) References Cited

U.S. PATENT DOCUMENTS

2009/0228174 A1 *  9/2009  Takagi ............... B60T 8/17558
                                                701/41
2011/0276227 A1 * 11/2011  Sugawara ........... B62D 15/025
                                                701/41

FOREIGN PATENT DOCUMENTS

| JP | 11049020 A | * | 2/1999 |
| JP | H11-49020 A |   | 2/1999 |
| JP | 3968198 B2 | * | 8/2007 |

* cited by examiner

*Primary Examiner* — Justin Holmes
(74) *Attorney, Agent, or Firm* — Rankin, Hill & Clark LLP

(57) ABSTRACT

A vehicle control device includes an information acquirer that acquires information on driving conditions of a vehicle at least containing a steering angle and a vehicle speed, a distribution amount setter that sets a distribution amount of a brake force to each of multiple wheels provided in the vehicle based on the driving conditions of the vehicle; and a brake controller that performs brake control of each of the multiple wheels according to the distribution amount set by the distribution amount setter. The distribution amount setter sets the distribution amount to zero when the steering angle SA is less than a first steering angle threshold where the steering angle SA is recognizable as a substantially neutral state.

7 Claims, 11 Drawing Sheets

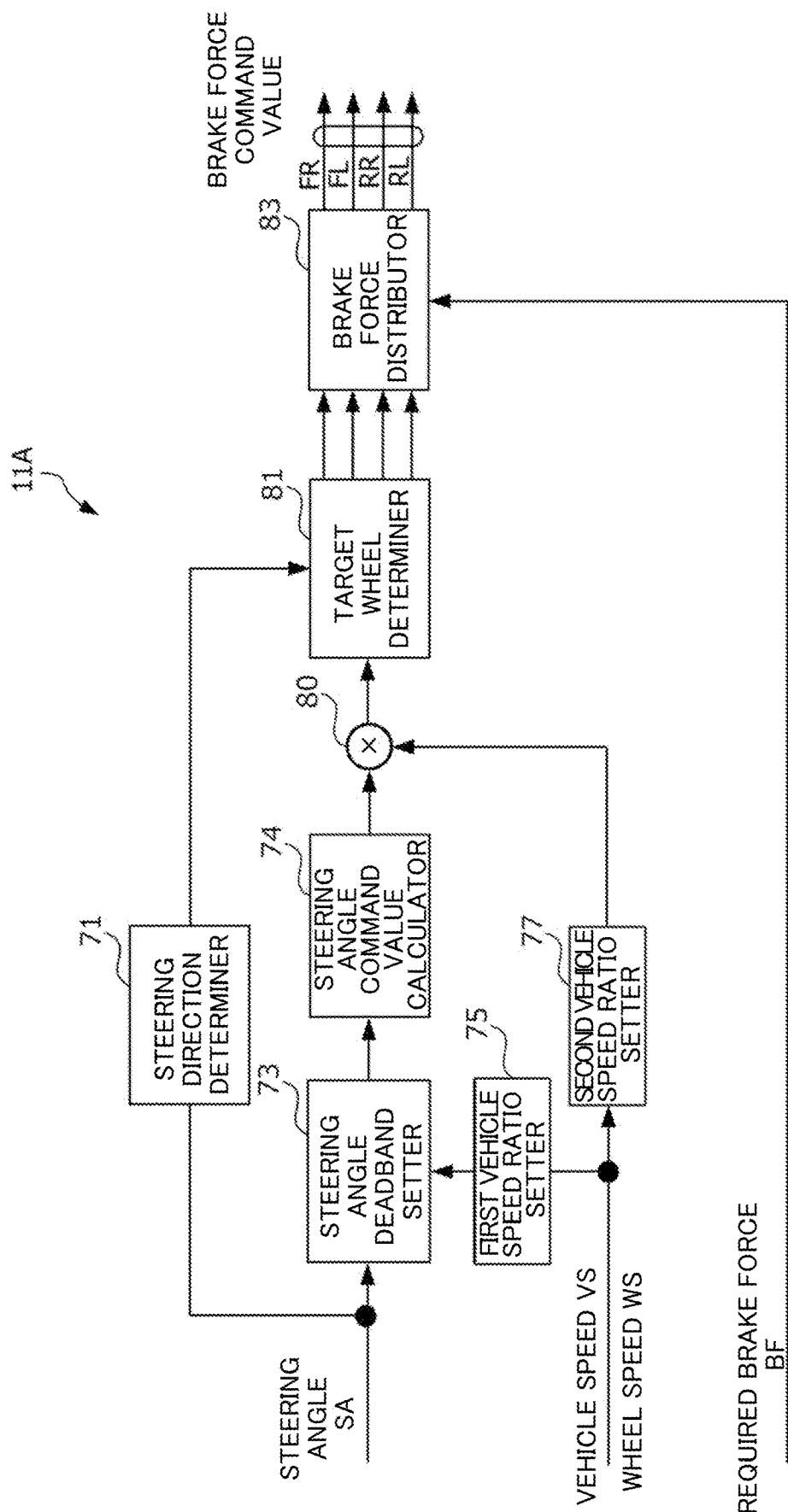

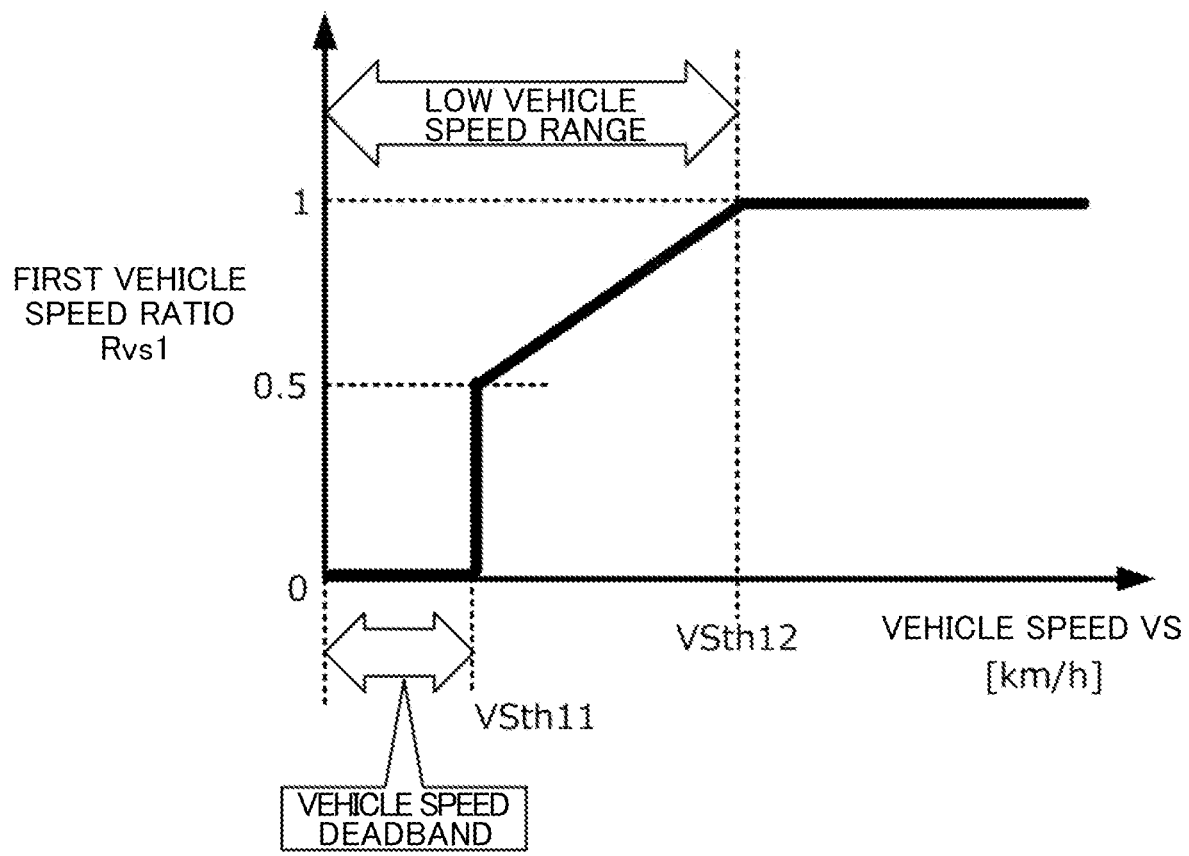

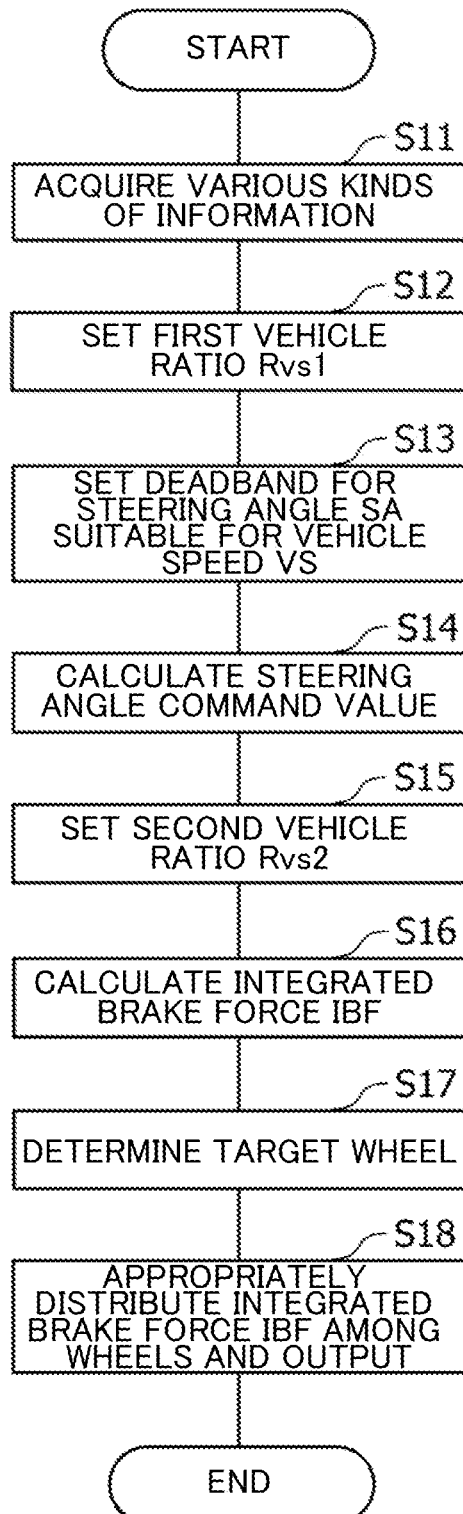

VEHICLE CONTROL DEVICE

BACKGROUND OF THE INVENTION

1. Field of the Invention

The present invention relates to a vehicle control device that performs brake control of each of multiple wheels provided in a vehicle.

2. Description of the Related Art

Patent Literature 1 discloses the invention of a vehicle control device that performs brake control of each of multiple wheels provided in a vehicle.

The vehicle control device according to Patent Literature 1 includes a steering sensor that detects a steering direction of a steering wheel, a braking device that performs a braking operation for each of the multiple wheels independently, and a brake force controller that generates a brake force on a turning-inner wheel (specific wheel) on a rear side in a vehicle traveling direction based on the traveling direction detected by a vehicle speed sensor and a steering direction detected by the steering sensor.

The vehicle control device according to Patent Literature 1 executes tight-turn facilitation control of a specific wheel in order to facilitate a tight turn of the vehicle, thereby making it possible to enhance the tight-turn performance with a simple configuration.

PRIOR ART DOCUMENT(S)

Patent Literature(s)

Patent literature 1: JPH11-049020A

SUMMARY OF THE INVENTION

However, when the vehicle control device in the related art applies a brake force to a specific wheel at a timing when the specific wheel starts to move in order to facilitate a tight turn of the vehicle, a brake system of the specific wheel may generate unusual sound (creeping noise). Since such creeping noise is unpleasant unusual sound, there is a problem that the noise gives an unpleasant feeling to a passenger.

The present invention was made in view of the above circumstances, and has an object to provide a vehicle control device capable of, even during execution of tight-turn facilitation control of a specific wheel in order to facilitate a tight turn of a vehicle, minimizing creeping noise as much as possible to create a comfort driving environment, thereby contributing to a development of a sustainable transport system.

To achieve the above object, a vehicle control device according to the present invention includes: an information acquirer that acquires information on driving conditions of a vehicle at least containing a steering angle of a steering wheel and a vehicle speed; a distribution amount setter that sets a distribution amount of a brake force to each of a plurality of wheels provided in the vehicle based on the driving conditions of the vehicle; and a brake controller that performs brake control of each of the plurality of wheels according to the distribution amount set by the distribution amount setter, and has a most important feather in which when the steering angle is less than a first steering angle threshold where the steering angle is recognizable as a substantially neutral state, the distribution amount setter sets the distribution amount to zero.

Even during execution of tight-turn facilitation control of a specific wheel in order to facilitate a tight turn of a vehicle, the vehicle control device according to the present invention is capable of minimizing creeping noise as much as possible to create a comfort driving environment, thereby contributing to a development of a sustainable transport system.

BRIEF DESCRIPTION OF THE DRAWINGS

FIG. 2A is a block diagram showing main components of a vehicle control device according to a first embodiment.

FIG. 2C is a characteristic chart of a first vehicle speed ratio that the vehicle control device according to the first embodiment refers to when changing a deadband for the steering angle according to a change in a vehicle speed when the vehicle speed is within a low vehicle speed range.

FIG. 3 is a flowchart showing operations of the vehicle control device according to the first embodiment.

DETAILED DESCRIPTION OF THE EMBODIMENTS

Figure 1:
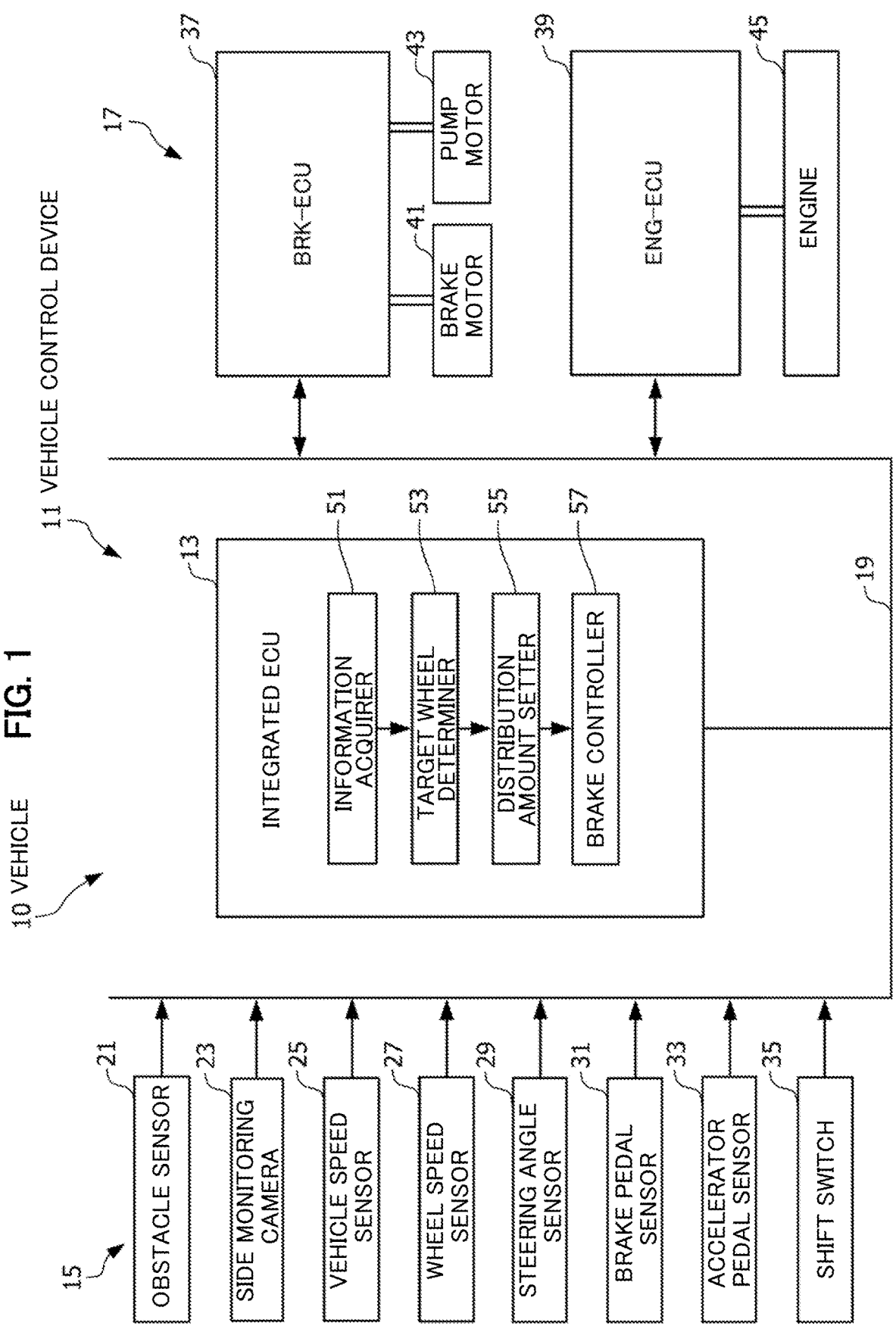
FIG. 1 is a block diagram showing an outline of the vehicle control device and its peripheral components according to an embodiment of the present invention.

Hereinafter, vehicle control devices according to several embodiments of the present invention will be described in detail with reference to the drawings as needed.

In the drawings to be described below, components having a common function or equivalent function will be denoted with a common reference sign in principle. For convenience of explanation, the size and shape of a characteristic chart are depicted schematically by deformation or exaggeration in some cases.

[Outline of Vehicle Control Device 11 According to Embodiment of Invention]

A vehicle control device 11 according to an embodiment of the present invention will be described with reference to FIG. 1. FIG. 1 is a block diagram showing an outline of the vehicle control device 11 and its peripheral components according to the embodiment of the present invention.

As shown in FIG. 1, the vehicle control device 11 is configured such that an integrated electronic control unit (ECU) 13, an input system 15, and an output system 17 are connected to each other via a communication medium 19 such as a control area network (CAN) so that information can be exchanged with each other.

The integrated ECU 13 is composed of a microcomputer including a central processing unit (CPU), a read only memory (ROM), a random access memory (RAM), and so on. This microcomputer reads and executes programs and information stored in the ROM, and thereby operates to perform execution control of various functions which are equipped in the integrated ECU 13 and which includes specific wheel brake control aiming to facilitate a tight turn of a vehicle 10.

The integrated ECU 13 has a function to execute the specific wheel brake control mainly aiming to facilitate a tight turn of the vehicle 10. The internal configuration of the integrated ECU 13 will be described in detail later.

As shown in FIG. 1, as the input system 15, obstacle sensors 21, side monitoring cameras 23, a vehicle speed sensor 25, wheel speed sensors 27, a steering angle sensor 29, a brake pedal sensor 31, an accelerator pedal sensor 33, and a shift switch 35 are connected to the communication medium 19.

The obstacle sensors 21 have a function to obtain information on a distribution of objects existing around the vehicle 10 (hereinafter referred to as "obstacles"). Although the obstacle OB (for example, see FIGS. 6A and 6B and so on) is not particularly limited, the obstacle OB include columnar objects such as utility poles and traffic signs, structures such as block walls and guardrails, other vehicles, and so on. The information on the distribution of obstacles contains information on a positional relationship of each obstacle OB relative to the vehicle 10 and a separation distance BD between the vehicle 10 and the obstacle OB.

Although obstacle sensors 21 are not particularly limited, the obstacle sensors 21 are composed of sonar sensors, and so on, and installed at four corners of the vehicle 10.

The information on the distribution of obstacles OB existing around the vehicle 10 obtained by the obstacle sensors 21 is transmitted to the integrated ECU 13.

The side monitoring cameras 23 are installed at respective side mirrors (not shown) and have a function to capture images on the right and left sides of the vehicle 10.

The images on the right and left sides of the vehicle 10 captured by the side monitoring cameras 23 are transmitted to the integrated ECU 13.

The vehicle speed sensor 25 has a function to detect a vehicle speed as a driving speed of the vehicle 10. The vehicle speed sensor 25 is attached to a crankshaft or a transmission of an internal combustion engine 45 and outputs a vehicle speed signal proportional to a rotation speed of a driving shaft.

The information on the vehicle speed detected by the vehicle speed sensor 25 is transmitted to all of the integrated ECU 13, a BRK-ECU 37, and an ENG-ECU 39 via the communication medium 19.

The wheel speed sensors 27 have a function to detect respective wheel speeds that are the rotation speeds of the multiple wheels provided in the vehicle 10. The wheel speed sensor 27 is attached to, for example, the vicinity of a rotor provided to each of the multiple wheels and outputs a wheel speed signal proportional to the rotation speed of the rotor.

The information on the wheel speeds detected by the wheel speed sensors 27 is transmitted to all of the integrated ECU 13, the BRK-ECU 37, and the ENG-ECU 39 via the communication medium 19.

The steering angle sensor 29 has a function to detect information on a steering angle that is a rotation position of a steering wheel (not shown). The information on the steering angle is expressed, for example, by assigning a numerical value [0] to a neutral position of the steering wheel, a numerical value with a positive sign to a right steering angle, and a numerical value with a negative sign to a left steering angle.

In other words, the information on the steering angle contains steering direction information expressed by the sign type (plus/minus) and steering degree information expressed by the magnitude of the numerical value. In the process of information processing, the steering direction information (the sign type) and the steering degree information (the absolute value of the steering angle) in the information on the steering angle are individually handled.

The steering angle sensor 29 is attached to, for example, a steering column, and outputs a steering angle signal (the information on the steering angle) depending on a rotation position of a steering shaft.

The information on the steering angle detected by the steering angle sensor 29 is transmitted to all of the integrated ECU 13, the BRK-ECU 37, and the ENG-ECU 39 via the communication medium 19.

The brake pedal sensor 31 has a function to detect a pressing operation amount and a pressing operation torque (BP operation information) of a brake pedal (not shown) operated for braking the vehicle 10 from an initial position (an operation position in a state where the driver's pressing operation is released).

The BP operation information detected by the brake pedal sensor 31 is transmitted to all of the integrated ECU 13, the BRK-ECU 37, and the ENG-ECU 39 via the communication medium 19.

The accelerator pedal sensor 33 has a function to detect a pressing operation amount (AP position information) of an accelerator pedal (not shown) operated for accelerating or decelerating the vehicle 10 from an initial position (an operation position in a state where the driver's pressing operation is released).

The AP position information detected by the accelerator pedal sensor 33 is transmitted to all of the integrated ECU 13, the BRK-ECU 37, and the ENG-ECU 39 via the communication medium 19.

The shift switch 35 has a function to receive a driver's selection operation of a shift range (for example, such as D range, R range, N range, and P range). The shift switch 35 is provided near the driver's seat in the vehicle 10.

Shift range operation information received by the shift switch 35 is transmitted to all of the integrated ECU 13, the BRK-ECU 37, and the ENG-ECU 39 via the communication medium 19.

Meanwhile, as the output system 17, the BRK-ECU 37 and the ENG-ECU 39 are connected to the communication medium 19 as shown in FIG. 1.

The BRK-ECU 37 has a function to operate a motor cylinder device (see, for example, JP2015-110378A) by driving a brake motor 41 according to a level of braking hydraulic pressure (primary hydraulic pressure) generated in a master cylinder (not shown) in response to a driver's braking operation, and thereby generate braking hydraulic pressure (secondary hydraulic pressure) for braking the vehicle 10.

For example, the BRK-ECU 37 also has a function to, in response to a deceleration control command transmitted from a brake controller 57 belonging to the integrated ECU 13, drive a pressure pump (not shown) by using a pump motor 43 and thereby perform control to adjust the brake force for each of the multiple (four) wheels to a brake force depending on a target hydraulic pressure of the wheel.

The ENG-ECU 39 has a function to perform drive control of the internal combustion engine 45 based on information on a driver's acceleration operation (accelerator pedal press amount) obtained via the accelerator pedal sensor 33.

In more detail, the ENG-ECU 39 performs the drive control of the internal combustion engine 45 by controlling operations of a throttle valve (not shown) for adjusting the intake air amount of the internal combustion engine 45, an injector (not shown) for injecting the fuel gas, an ignition plug (not shown) for igniting the fuel, and so on.

[Internal Configuration of Integrated ECU 13]

Next, the internal configuration of the integrated ECU 13 will be described with reference to FIG. 1 as needed.

FIG. 1 includes a functional block diagram representing the internal configuration of the integrated ECU 13.

As shown in FIG. 1, the integrated ECU 13 includes an information acquirer 51, a target wheel determiner 53, a distribution amount setter 55, and the brake controller 57.

The information acquirer 51 has a function to acquire each of the information on the distribution of obstacles existing around the vehicle 10 obtained by the obstacle sensors 21, the information of the images on the right and left sides of the vehicle 10 captured by the side monitoring cameras 23, the information on the vehicle speed detected by the vehicle speed sensor 25, the information on the wheel speeds detected by the wheel speed sensors 27, the BP operation information detected by the brake pedal sensor 31, the AP position information detected by the accelerator pedal sensor 33, and the shift range operation information received by the shift switch 35.

The target wheel determiner 53 has a function to determine a target wheel to be involved in tight-turn facilitation control aiming to facilitate a tight turn of the vehicle 10 based on the information on the vehicle speed, the information on the wheel speeds, the information on the steering angle, and so on acquired by the information acquirer 51. In general, in the vehicle 10 that is turning while driving forward at a slow vehicle speed (a vehicle speed of about 10 km/h or lower at which the vehicle 10 can stop quickly), the rear turning-inner wheel is selected as the specific wheel.

The distribution amount setter 55 plays roles in calculating an integrated brake force IBF for the tight-turn facilitation control aiming to facilitate a tight turn of the vehicle 10 based on the information on the vehicle speed VS, the information on the wheel speeds WS, the information on the steering angle SA, a required brake force BF based on the BP operation information, and so on acquired by the information acquirer 51 and in setting a distribution amount of the calculated integrated brake force IBF to each of the multiple wheels including the specific wheel.

Various functions equipped in the distribution amount setter 55 will be described in detail later.

The brake controller 57 preforms brake control for each of the wheels including the specific wheel according to the distribution amounts set by the distribution amount setter 55. Note that, the brake controller 57 executes the tight-turn facilitation control even in the absence of input of the BP operation information (the information on the required brake force BF).

[Block Configuration Showing Main Components of Vehicle Control Device 11A According to First Embodiment of Invention]

Next, main components of a vehicle control device 11A according to a first embodiment of the present invention will be described with reference to FIGS. 2A to 2D as needed.

Figure 2B:
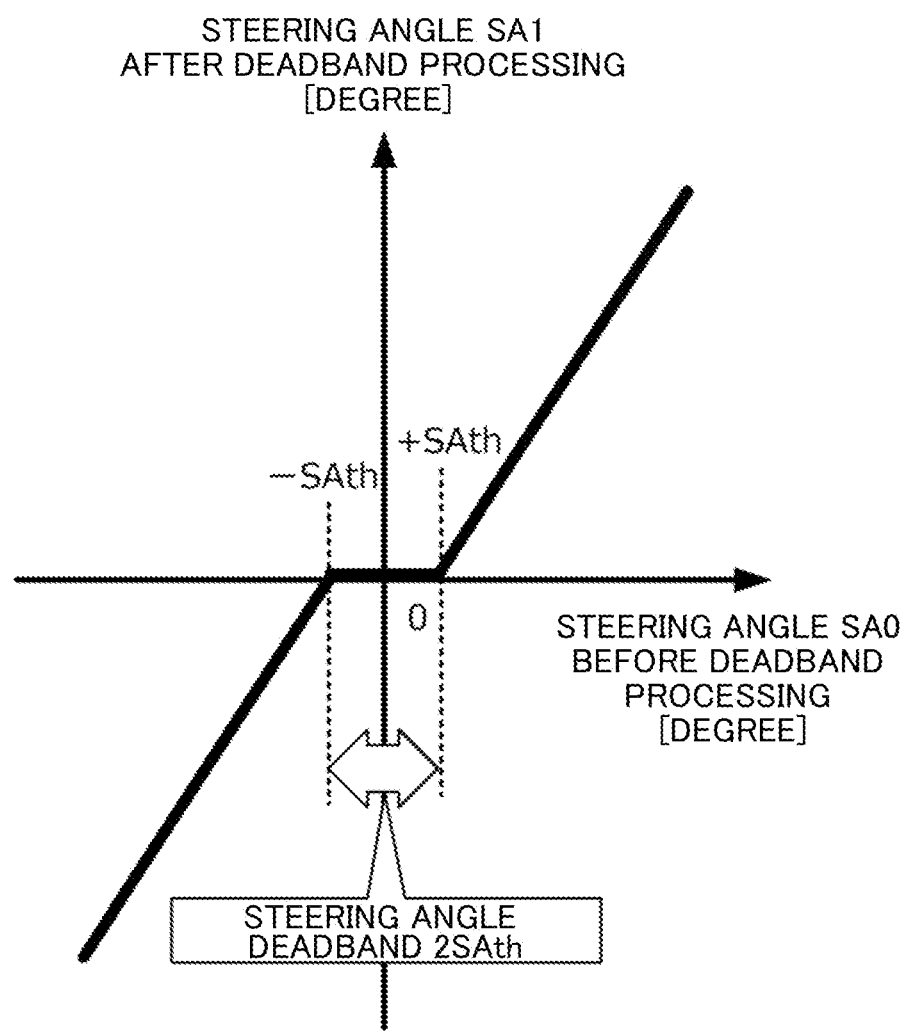
FIG. 2B is a characteristic chart that the vehicle control device according to the first embodiment refers to when setting a deadband for a steering angle, the characteristic chart presenting steering angles in comparison before and after deadband processing for the steering angle.
Figure 2D:
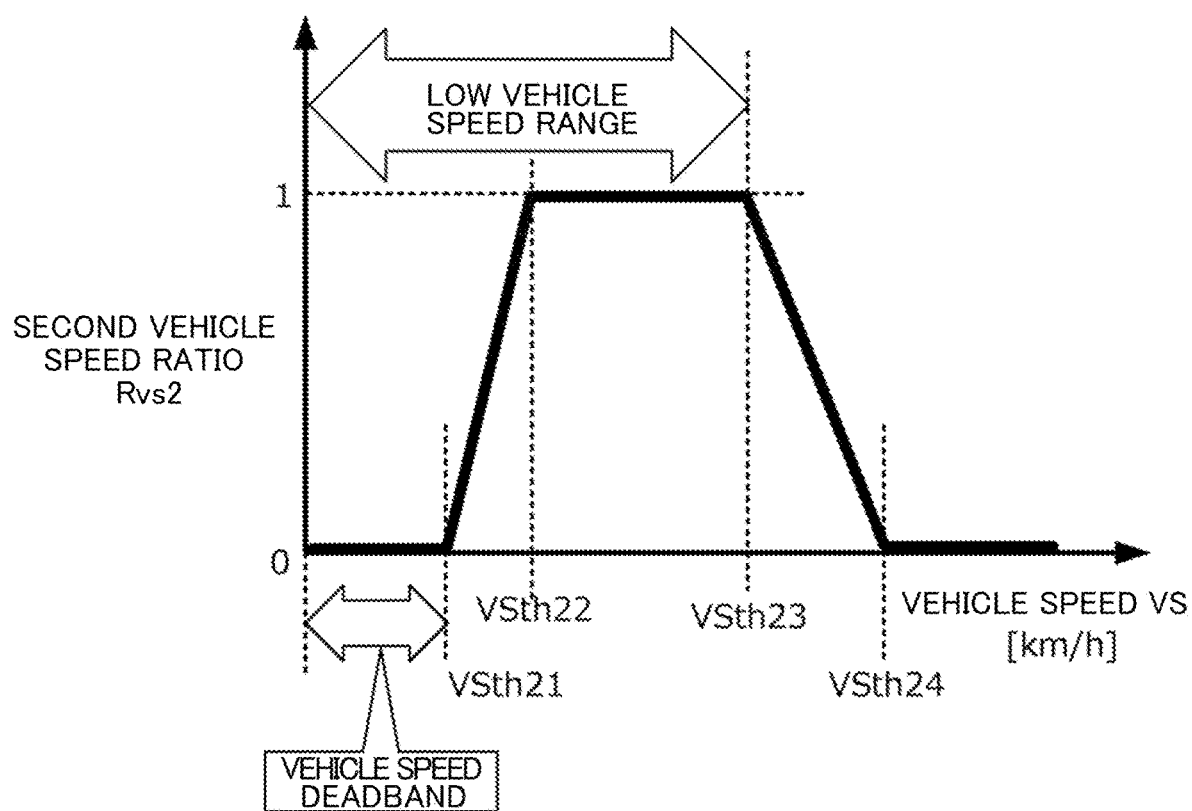
FIG. 2D is a characteristic chart of a second vehicle speed ratio that the vehicle control device according to the first embodiment refers to when changing a brake force for a specific wheel according to a change in the vehicle speed when the vehicle speed is within a low vehicle speed range.

FIG. 2A is a block diagram showing the main components of the vehicle control device 11A according to the first embodiment. FIG. 2B is a characteristic chart which the vehicle control device 11A according to the first embodiment refers to when setting a deadband for a steering angle SA, and in which steering angles before and after deadband processing for the steering angle SA are shown in comparison. FIG. 2C is a characteristic chart of a first vehicle speed ratio Rvs1 that the vehicle control device 11A according to the first embodiment refers to when changing the deadband for the steering angle SA according to a change in the vehicle speed VS when the vehicle speed VS is within a low vehicle speed range. FIG. 2D is a characteristic chart of a second vehicle speed ratio Rvs2 that the vehicle control device 11A according to the first embodiment refers to when changing the brake force for a specific wheel according to a change in the vehicle speed VS when the vehicle speed VS is within a low vehicle speed range.

As shown in FIG. 2A, the vehicle control device 11A according to the first embodiment includes a steering direction determiner 71, a steering angle deadband setter 73, a steering angle command value calculator 74, a first vehicle speed ratio setter 75, a second vehicle speed ratio setter 77, a first multiplier 80, a target wheel determiner 81, and a brake force distributor 83.

The steering direction determiner 71 determines a steering direction based on the steering direction information (sign type) in the information on the steering angle SA.

As shown in FIG. 2B, the steering angle deadband setter 73 sets a deadband width for the steering angle SA based on the information on the steering angle SA. The deadband width for the steering angle SA means an operation region where steering is recognized as invalid based on the neutral position (steering center point) of the steering wheel. In the example shown in FIG. 2B, an x axis represents a steering angle SA0 before the deadband processing and a y axis represents a steering angle SA1 after the deadband processing. As shown in FIG. 2B, a deadband width 2SAth for the steering angle SA is defined by a left steering critical value (−SAth) and a right steering critical value (+SAth) positioned on both sides of the steering center point. The absolute value |SAth| of each of the left steering critical value (−SAth) and the right steering critical value (+SAth) is equivalent to a first steering angle threshold.

In the example shown in FIG. 2B, the information on the steering angle SA is expressed by a combination of the sign indicating the steering direction and the numerical value indicating the steering degree.

In more detail, the steering angle deadband setter 73 sets the first steering angle threshold (|SAth|) based on the information on the steering angle SA and the information on the vehicle speed VS (the first vehicle speed ratio Rvs1). specifically, when the vehicle speed is within a low vehicle speed range (for example, a slow vehicle speed range of about 10 km/h or lower), the steering angle deadband setter 73 variably sets the first steering angle threshold (|SAth|) to a smaller value as the vehicle speed VS becomes lower. In other words, the deadband width 2SAth for the steering angle SA is set to be narrower as the vehicle speed VS becomes lower.

Thus, when the vehicle speed VS is within the low vehicle speed range, even a slight change in the steering angle SA is reflected in a calculate result of calculation of a brake force for the tight-turn facilitation control.

The steering angle command value calculator 74 calculates a steering angle command value based on the deadband width 2SAth for the steering angle SA set by the steering angle deadband setter 73.

The first vehicle speed ratio setter 75 has a function to set a value of the first vehicle speed ratio Rvs1 to be referred to for changing the deadband width 2SAth for the steering angle SA according to a change in the vehicle speed VS.

To implement the above function, when the vehicle speed VS is within the low vehicle speed range (VS<VSth12), in particular, the first vehicle speed ratio setter 75 appropriately sets a value less than 1 as the first vehicle speed ratio Rvs1 suitable for the vehicle speed VS according to the characteristic chart shown in FIG. 2C.

In more detail, in the first vehicle speed ratio Rvs1 having the characteristic shown in FIG. 2C, a fixed value (0) is allocated for the vehicle speed VS within a region up to an 11th vehicle speed value Vsth11 (VS=<VSth11), a linear variable value (0.5-1) is allocated for the vehicle speed VS within a region above the 11th vehicle speed value Vsth11 up to a 12th vehicle speed value Vsth12 (VSth11<VS=<VSth12), and a fixed value (1) is allocated for the vehicle speed VS within a region above the 12th vehicle speed value Vsth12 (VS>VSth12).

The steering angle deadband setter 73 multiplies the value of the first vehicle speed ratio Rvs1 set by the first vehicle speed ratio setter 75 by the numerical value of the steering angle SA indicating the steering degree. In this way, when the vehicle speed VS is within the low vehicle speed range (VS<VSth12), the deadband width 2SAth for the steering angle SA can be changed according to a change in the vehicle speed VS.

The second vehicle speed ratio setter 77 has a function to set a value of the second vehicle speed ratio Rvs2 to be referred to for changing the brake force for the specific wheel according to a change in the vehicle speed VS.

To implement the above function, when the vehicle speed VS is within a low vehicle speed range (VS=<VSth22), the second vehicle speed ratio setter 77 appropriately sets a value less than 1 as the second vehicle speed ratio Rvs2 suitable for the vehicle speed VS according to the characteristic chart shown in FIG. 2D.

In more detail, in the second vehicle speed ratio Rvs2 having the characteristic shown in FIG. 2D, a fixed value (0) is allocated for the vehicle speed VS within a region up to a 21st vehicle speed value VSth21 (VS=<VSth21), and a variable value (0-1) having a gradually increasing linear characteristic is allocated for the vehicle speed VS within a region above the 21st vehicle speed value VSth21 up to a 22nd vehicle speed value VSth22 (VSth21<VS=<VSth22).

Instead of the variable value (0-1) having the gradually increasing linear characteristic, for example, a variable value (0-1) having a gradually increasing non-linear characteristic with gentle rise from 0 may be employed.

Then, a fixed value (1) is allocated for the vehicle speed VS within a region above the 22nd vehicle speed value VSth22 up to a 23rd vehicle speed value VSth23 (VSth22<VS=<VSth23).

Further, a variable value (1-0) having a gradually decreasing linear characteristic is allocated for the vehicle speed VS within a region above the 23rd vehicle speed value VSth23 up to a 24th vehicle speed value VSth24 (VSth23<VS=<VSth24), and a fixed value (0) is allocated for the vehicle speed VS within a region above the 24th vehicle speed value VSth24 (VS>VSth24).

The first multiplier 80 multiplies the value of the second vehicle speed ratio Rvs2 set by the second vehicle speed ratio setter 77 by the steering angle command value calculated by the steering angle command value calculator 74.

In this way, in a case where the vehicle speed VS takes a value exceeding the deadband region (0=<VS=<VSth21) in the low vehicle speed range (in sum, a case where the specific wheel that was stopped starts to move), it is possible to, according to a change in the vehicle speed VS, gradually increase the brake force for the specific wheel as the vehicle speed VS becomes higher (gradually decrease the brake force for the specific wheel as the vehicle speed VS becomes lower), instead of instantaneously raising the brake force for the specific wheel (sharply increasing the value of the second vehicle speed ratio Rvs2 from 0 to 1).

As a result, even during execution of the tight-turn facilitation control of the specific wheel in order to facilitate a tight turn of the vehicle 10, it is possible to minimize creeping noise as much as possible to create a comfort driving environment, thereby contributing to a development of a sustainable transport system.

Here, the 11th vehicle speed value VSth11 (see FIG. 2C) for the first vehicle speed ratio setter 75 and the 21st vehicle speed value VSth21 (see FIG. 2D) for the second vehicle speed ratio setter 77 may be a common value or values different from each other.

Similarly, the 12th vehicle speed value VSth12 (see FIG. 2C) for the first vehicle speed ratio setter 75 and the 22nd vehicle speed value VSth22 (see FIG. 2D) for the second vehicle speed ratio setter 77 may be a common value or values different from each other.

The first multiplier 80 multiplies the steering angle command value calculated by the steering angle command value calculator 74 by the value of the second vehicle speed ratio Rvs2 set by the second vehicle speed ratio setter 77. Thus, the first multiplier 80 calculates the integrated brake force IBF that is a brake force for the tight-turn facilitation control with both of the steering angle SA and the vehicle speed VS taken into consideration. The integrated brake force IBF, that is, a multiplication result of the first multiplier 80 is transmitted to both of the target wheel determiner 81 and the brake force distributor 83.

As in the target wheel determiner 53, the target wheel determiner 81 determines a target wheel to be involved in the tight-turn facilitation control aiming to facilitate a tight turn of the vehicle 10 based on the information on the vehicle speed VS, the information on the wheel speeds WS, the information on the steering angle SA, and so on acquired by the information acquirer 51. The target wheel thus determined may be herein referred to as a specific wheel in some cases.

The brake force distributor 83 distributes the integrated brake force IBF for the tight-turn facilitation control among the multiple wheels including the specific wheel as appropriate based on the information on the vehicle speed VS, the information on the wheel speeds WS, the information on the steering angle SA, the information on the required brake force, and so on acquired by the information acquirer 51, and outputs each of the brake forces thus distributed as a brake force command value.

[Operations of Vehicle Control Device 11A According to First Embodiment]

Next, operations of the vehicle control device 11A according to the first embodiment will be described with reference to FIG. 3.

FIG. 3 is a flowchart showing operations of the vehicle control device 11A according to the first embodiment.

In step S11 shown in FIG. 3, the information acquirer 51 in the integrated ECU 13 acquires each of various kinds of information containing the information on the vehicle speed VS, the information on the wheel speeds WS, the information on the steering angle SA, the BP operation information, the AP position information, the shift range operation information, the information on an obstacle distribution OD, the information on images on the right and left sides of the vehicle 10.

In step S12, the first vehicle speed ratio setter 75 sets the value of the first vehicle speed ratio Rvs1 to be referred to for changing the deadband width 2SAth for the steering angle SA according to a change in the vehicle speed VS.

In step S13, the steering angle deadband setter 73 sets the first steering angle threshold (|SAth|) based on the information on the steering angle SA and the information on the vehicle speed VS (the first vehicle speed ratio Rvs1). As a result, the deadband width 2SAth for the steering angle SA is set.

In step S14, the steering angle command value calculator 74 calculates the steering angle command value based on the deadband width 2SAth for the steering angle SA set by the steering angle deadband setter 73.

In step S15, the second vehicle speed ratio setter 77 sets the value of the second vehicle speed ratio Rvs2 to be referred to for changing the brake force for the specific wheel according to a change in the vehicle speed VS. When the vehicle speed VS is within the low vehicle speed range, the second vehicle speed ratio Rvs2 to be variably set depending on the vehicle speed VS is set to a value less than 1.

In step S16, the first multiplier 80 multiplies the steering angle command value calculated by the steering angle command value calculator 74 by the value of the second vehicle speed ratio Rvs2 set by the second vehicle speed ratio setter 77, thereby calculating the integrated brake force IBF for the tight-turn facilitation control with both of the steering angle SA and the vehicle speed VS taken into consideration.

In step S17, the target wheel determiner 81 determines a target wheel to be involved in the tight-turn facilitation control aiming to facilitate a tight turn of the vehicle 10 based on the information on the vehicle speed VS, the information on the wheel speeds WS, the information on the steering angle SA, and so on acquired by the information acquirer 51 as in the target wheel determiner 53.

In step S18, the brake force distributor 83 distributes the integrated brake force IBF for the tight-turn facilitation control among the multiple wheels including the specific wheel as appropriate based on the information on the vehicle speed VS, the information on the wheel speeds WS, the information on the steering angle SA, the information on the required brake force, and so on acquired by the information acquirer 51, and outputs each of the brake forces thus distributed as a brake force command value.

[Effects of Vehicle Control Device 11A According to First Embodiment]

In the vehicle control device 11A according to the first embodiment, when the vehicle speed VS is equal to or lower than the 22nd vehicle speed value VSth22 (see FIG. 2D: equivalent to the "first vehicle speed threshold" of the present invention) within the low vehicle speed range (for example, the slow vehicle speed range of about 10 km/h or less), the distribution amount setter 55 sets a distribution amount of the brake force to each of the multiple wheels including the specific wheel to a value which is smaller than a distribution amount when the vehicle speed VS exceeds the 22nd vehicle speed value VSth22.

When the vehicle speed VS is equal to or lower than the 22nd vehicle speed value VSth22 (the first vehicle speed threshold) and is increasing, in particular, the distribution amount setter 55 gradually increases the distribution amount until the vehicle speed VS exceeds the 22nd vehicle speed value VSth22 (see FIG. 2D).

In this way, in the case where the vehicle speed VS takes a value exceeding a deadband region (0=<VS=<VSth21) in the low vehicle speed range (in sum, the case where the specific wheel that was stopped starts to move), the vehicle control device 11A according to the first embodiment is capable of gradually increasing the brake force for the specific wheel as the vehicle speed VS becomes higher according to a change in the vehicle speed VS.

The vehicle control device 11A according to the first embodiment is capable of, even during execution of the tight-turn facilitation control of the specific wheel in order to facilitate a tight turn of the vehicle 10, minimizing creeping noise as much as possible to create a comfort driving environment, thereby contributing to a development of a sustainable transport system.

Moreover, as shown in FIG. 2D, when the vehicle speed VS is equal to or lower than the 22nd vehicle speed value VSth22 (the first vehicle speed threshold), the distribution amount setter 55 calculates the distribution amounts based on the wheel speeds WS if the vehicle speed VS is equal to or lower than the 21st vehicle speed value VSth21 (the second vehicle speed threshold) that is lower than the 22nd vehicle speed value VSth22, or calculates the distribution amounts based on the vehicle speed VS if the vehicle speed VS exceeds the 21st vehicle speed value VSth21 (the second vehicle speed threshold).

In the vehicle control device 11A according to the first embodiment, along with a change in the vehicle speed VS, the information as a basis for calculating the distribution amounts is switched to use at least one kind of the vehicle speed VS and the wheel speeds WS.

When the vehicle speed VS is equal to or lower than the 21st vehicle speed value VSth21 (the second vehicle speed threshold) lower than the 22nd vehicle speed value VSth22 (the vehicle speed VS is very low), in particular, the distribution amounts are calculated based on the wheel speeds WS that enable the brake control of each of the multiple wheels to be executed with high accuracy. This makes it possible to further enhance the effect of executing suitable tight-turn facilitation control while minimizing creeping noise as much as possible.

In addition, the use of at least one kind of the vehicle speed VS and the wheel speeds WS as the information as the basis for calculating the distribution amounts can be expected to obtain an effect of enabling the tight-turn facilitation control to be executed as far as possible even if a failure to acquire one kind of the vehicle speed VS and the wheel speeds WS occurs.

In the vehicle control device 11A according to the first embodiment, the distribution amount setter 55 may be configured to set the distribution amount to zero when the steering angle SA is less than the first steering angle threshold (SA<|SAth|: see FIG. 2B) where the steering angle SA is recognizable as a substantially neutral state. In this case, when the steering angle SA is less than the first steering angle threshold, the distribution amount is zero. Here, the expression that the distribution amount is zero is a concept that includes both of a mode were a previously non-zero value is changed to zero and a mode where a previously zero value remains zero.

The distribution amount setter 55 sets the distribution amount to zero (consequently the distribution amount is zero) when the steering angle SA is less than the first steering angle threshold where the steering angle SA is recognizable as the substantially neutral state. Thus, even when slight correction steering, which may appear during straight driving, is performed, the vehicle control device 11A according to the first embodiment invalidates the correction steering and is prevented from executing the tight-turn facilitation control. As a result, an unexpected execution of the tight-turn facilitation control can be avoided.

In addition, even during execution of the tight-turn facilitation control on the specific wheel in order to facilitate a tight turn of the vehicle 10, it is possible to minimize creeping noise as much as possible to create a comfort driving environment, thereby contributing to a development of a sustainable transport system.

[Block Configuration Showing Main Components of Vehicle Control Device 11B According to Second Embodiment of Invention]

Next, main components of a vehicle control device 11B according to a second embodiment of the present invention will be described with reference to FIGS. 4A to 4D as needed.

Figure 4A:
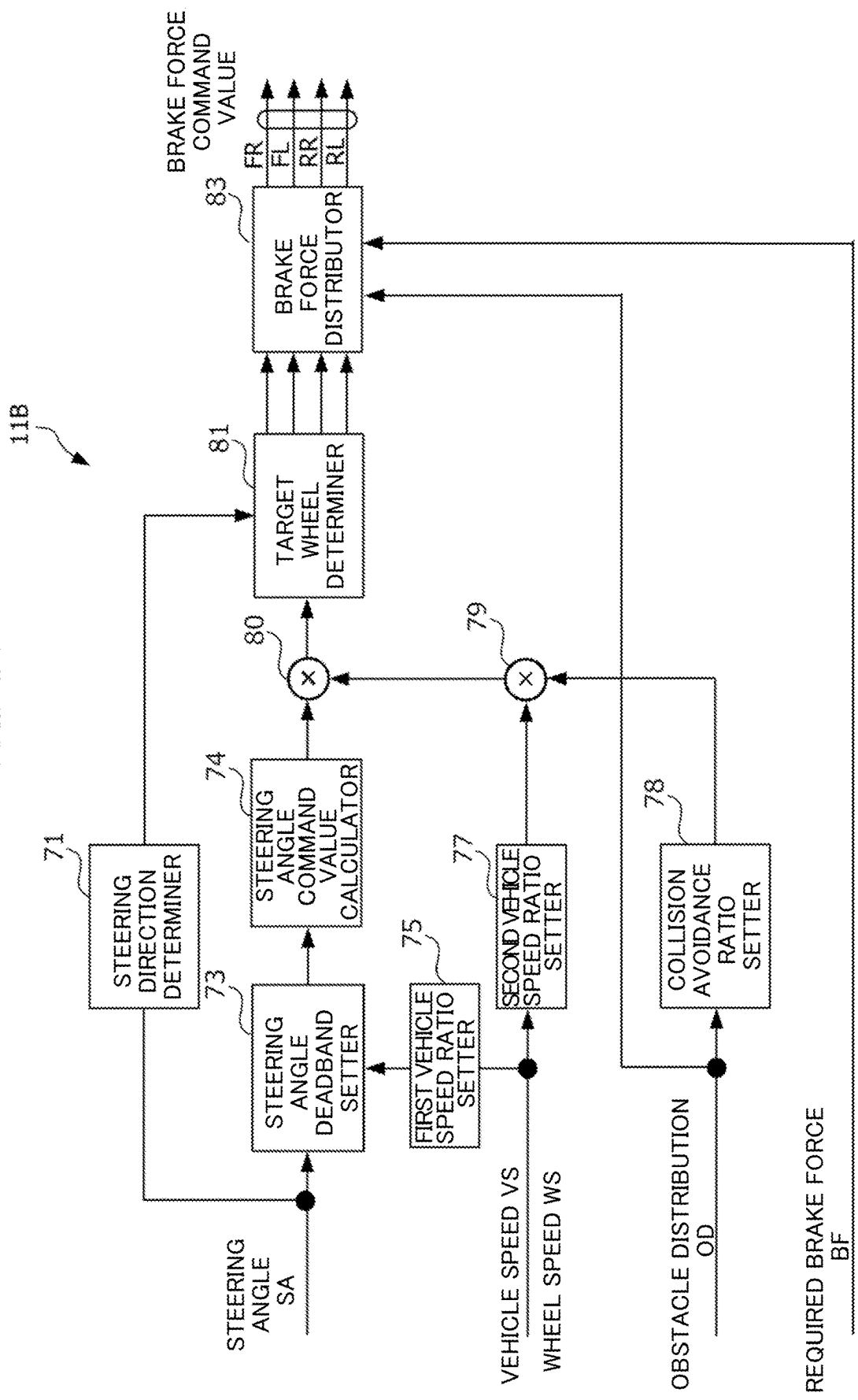
FIG. 4A is a block diagram showing main components of a vehicle control device according to a second embodiment.
Figure 4B:
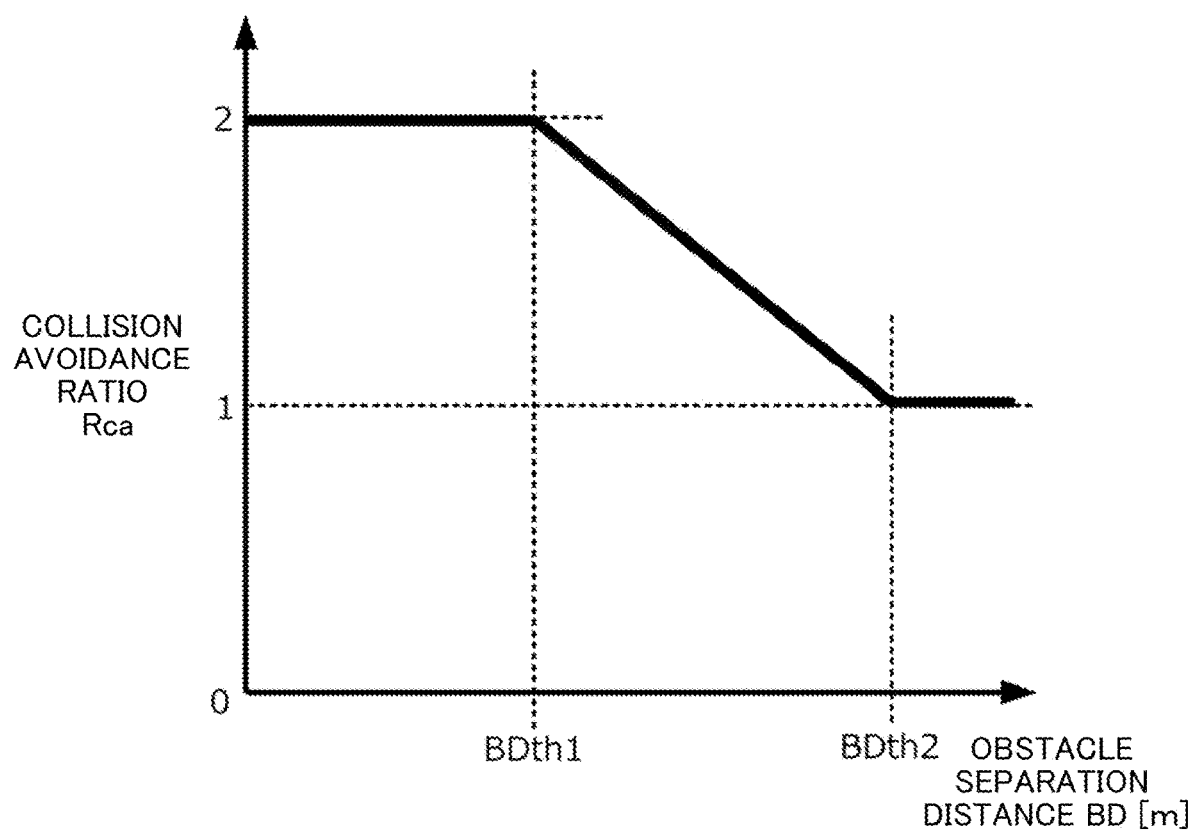
FIG. 4B is a characteristic chart of a collision avoidance ratio that the vehicle control device according to the second embodiment refers to when changing a brake force for a specific wheel according to a change in an obstacle separation distance.

FIG. 4A is a block diagram showing the main components of the vehicle control device 11B according to the second embodiment. FIG. 4B is a characteristic chart of a collision avoidance ratio Rca that the vehicle control device 11B according to the second embodiment refers to when changing a brake force for a specific wheel according to a change in an obstacle separation distance BD.

The vehicle control device 11A according to the first embodiment and the vehicle control device 11B according to the second embodiment have some components in common.

Therefore, the description of the vehicle control device 11B according to the second embodiment will be given by focusing on differences between the two while omitting the description of the components common to the two.

As shown in FIG. 4A, the vehicle control device 11B according to the second embodiment includes a steering direction determiner 71, a steering angle deadband setter 73, a steering angle command value calculator 74, a first vehicle speed ratio setter 75, a second vehicle speed ratio setter 77, a collision avoidance ratio setter 78, a second multiplier 79, a first multiplier 80, a target wheel determiner 81, and a brake force distributor 83.

Here, as compared with the vehicle control device 11A according to the first embodiment, the collision avoidance ratio setter 78 and the second multiplier 79 are added to the vehicle control device 11B according to the second embodiment.

The collision avoidance ratio setter 78 has a function to, when an obstacle OB exists around the vehicle 10, set a collision avoidance ratio Rca to be referred to for changing a brake force for a specific wheel according to a change in an obstacle separation distance BD that is a distance between the vehicle 10 and the obstacle OB.

To implement the above function, when an obstacle OB exists around the vehicle 10, the collision avoidance ratio setter 78 sets the value of the collision avoidance ratio Rca as appropriate depending on a change in the obstacle separation distance BD according to the characteristic chart shown in FIG. 4B.

In more detail, in the collision avoidance ratio Rca having the characteristic shown in FIG. 4B, a fixed value (2) is allocated for the obstacle separation distance BD within a region up to a first separation distance value BDth1 (BD=<BDth1), a variable value (2-1) having a gradually decreasing linear characteristic is allocated for the obstacle separation distance BD within a region above the first separation distance value BDth1 up to a second separation distance value BDth2 (BDth1<BD=<BDth2), and a fixed value (1) is allocated for the obstacle separation distance BD within a region above the second separation distance value BDth2 (BD>BDth2).

Although the above collision avoidance ratio Rca is described by taking the example where the fixed value (2) is allocated for the obstacle separation distance BD within the region up to the first separation distance value BDth1, the present invention is not limited to this example. It is possible to employ a mode where a certain fixed value (which should be a value more than 1) is allocated for the obstacle separation distance BD within the region up to the first separation distance value BDth1.

In addition, in the above collision avoidance ratio Rca, a variable value (2-1) having a gradually decreasing non-linear characteristic may be employed in place of the variable value (2-1) having the gradually decreasing linear characteristic.

The second multiplier 79 multiplies the value of the collision avoidance ratio Rca set by the collision avoidance ratio setter 78 by the value of the second vehicle speed ratio Rvs2 set by the second vehicle speed ratio setter 77. A correction coefficient CF that is the multiplication result of the second multiplier 79 is transmitted to the first multiplier 80.

Thus, in a case where the obstacle separation distance BD takes a value equal to or less than the first separation distance value BDth1 (BD=<BDth1) (in sum, a case where a risk of collision is relatively high with a small obstacle separation distance BD), the value of the collision avoidance ratio Rca is fixed to (2) (the amount of control is doubled) irrespective of a change in the obstacle separation distance BD, so that a collision can be avoided (the risk of collision can be reduced).

Meanwhile, in a case where the obstacle separation distance BD takes a value more than the first separation distance value BDth1 and that is equal to or less than the second separation distance value BDth2 (BDth1<BD=<BDth2) (in sum, a case where the risk of collision is relatively low with a large obstacle separation distance BD, the amount of control is gradually decreased as the obstacle separation distance BD becomes larger according to a change in the obstacle separation distance BD, so that an influence of the collision avoidance (risk of collision reduction) on the amount of control can be gradually decreased.

Then, in a case where the obstacle separation distance BD takes a value more than the second separation distance value BDth2 (BD>BDth2) (in sum, a case where the risk of collision is sufficiently low with a sufficiently large obstacle separation distance BD), the value of the collision avoidance ratio Rca is fixed to (1) irrespective of a change in the obstacle separation distance BD, so that the influence of the collision avoidance (the reduction in the risk of collision) on the amount of control can be eliminated.

The first multiplier 80 multiplies the steering angle command value calculated by the steering angle command value calculator 74 by the multiplication result (the correction coefficient CF) of the second multiplier 79. Thus, the first multiplier 80 calculates the integrated brake force IBF that is the brake force for the tight-turn facilitation control with all of the steering angle SA, the vehicle speed VS, and the obstacle distribution OD taken into consideration. The integrated brake force IBF, that is, the multiplication result of the first multiplier 80 is transmitted to both of the target wheel determiner 81 and the brake force distributor 83.

[Operations of Vehicle Control Device 11B According to Second Embodiment]

Next, operations of the vehicle control device 11B according to the second embodiment will be described with reference to FIG. 5.

Figure 5:
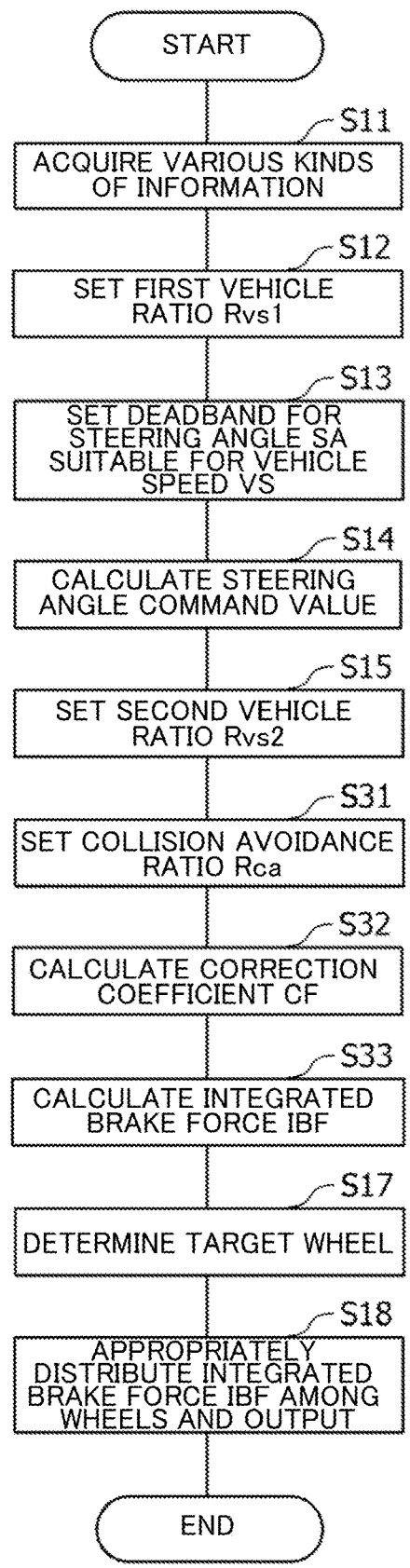
FIG. 5 is a flowchart showing operations of the vehicle control device according to the second embodiment.

FIG. 5 is a flowchart showing operations of the vehicle control device 11B according to the second embodiment.

The vehicle control device 11A according to the first embodiment and the vehicle control device 11B according to the second embodiment perform some operations in common.

Therefore, the description of the operations of the vehicle control device 11B according to the second embodiment will be given by focusing on differences between the two while omitting the description of the operations common to the two.

In step S31 shown in FIG. 5, when an obstacle OB exists around the vehicle 10, the collision avoidance ratio setter 78 sets the value of the collision avoidance ratio Rca to be referred to for changing the brake force for the specific wheel according to a change in the obstacle separation distance BD.

In the case where the obstacle separation distance BD takes a value equal to or less than the first separation distance value BDth1 (BD=<BDth1) (in sum, the case where the risk of collision is relatively high with a small obstacle separation distance BD), the fixed value (2: the amount of control is doubled) is set as the collision avoidance ratio Rca irrespective of a change in the obstacle separation distance BD. This makes it possible to avoid a collision (reduce the risk of collision) in the case where the risk of collision is relatively high.

In step S32, the second multiplier 79 multiplies the value of the second vehicle speed ratio Rvs2 set by the second vehicle speed ratio setter 77 by the value of the collision avoidance ratio Rca set by the collision avoidance ratio setter 78, thereby calculating the correction coefficient CF with both of the vehicle speed VS and the obstacle distribution OD taken into consideration.

In step S33, the first multiplier 80 multiplies the steering angle command value calculated by the steering angle command value calculator 74 by the multiplication result (correction coefficient CF) of the second multiplier 79, thereby calculating the integrated brake force IBF that is the brake force for the tight-turn facilitation control with all of the steering angle SA, the vehicle speed VS, and the obstacle distribution OD taken into consideration.

[Effects of Vehicle Control Device 11B According to Second Embodiment]

Next, effects of the vehicle control device 11B according to the second embodiment will be described with reference to FIGS. 6A, 6B, 7A, and 7B as needed.

Figure 6A:
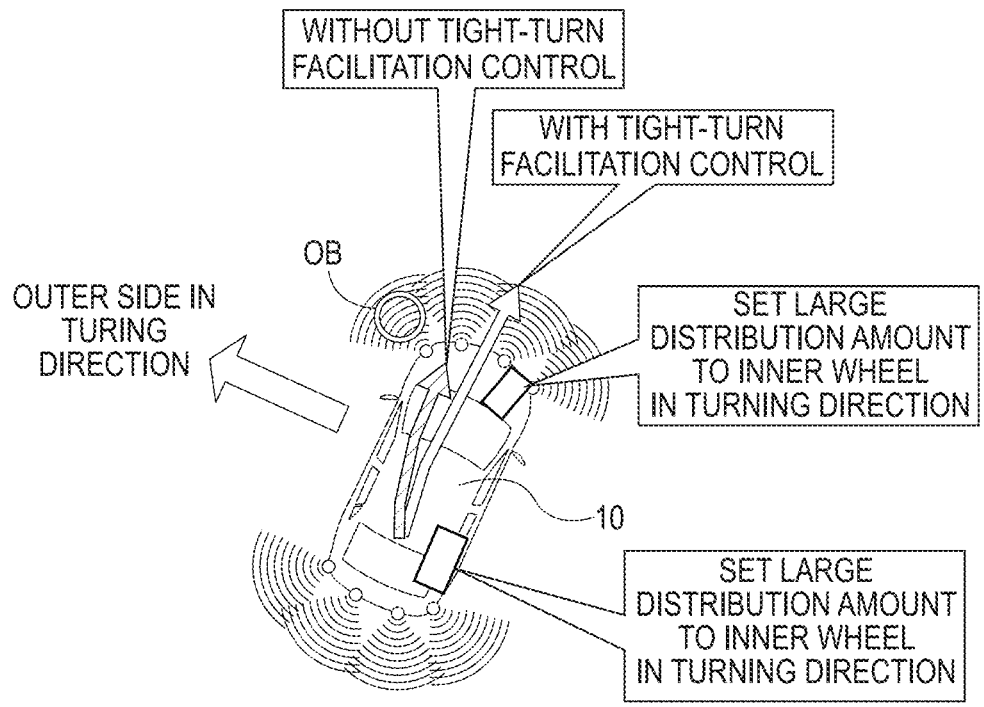
FIG. 6A is a diagram for explaining an operation for vehicle forward driving in the vehicle control device according to the second embodiment.
Figure 6B:
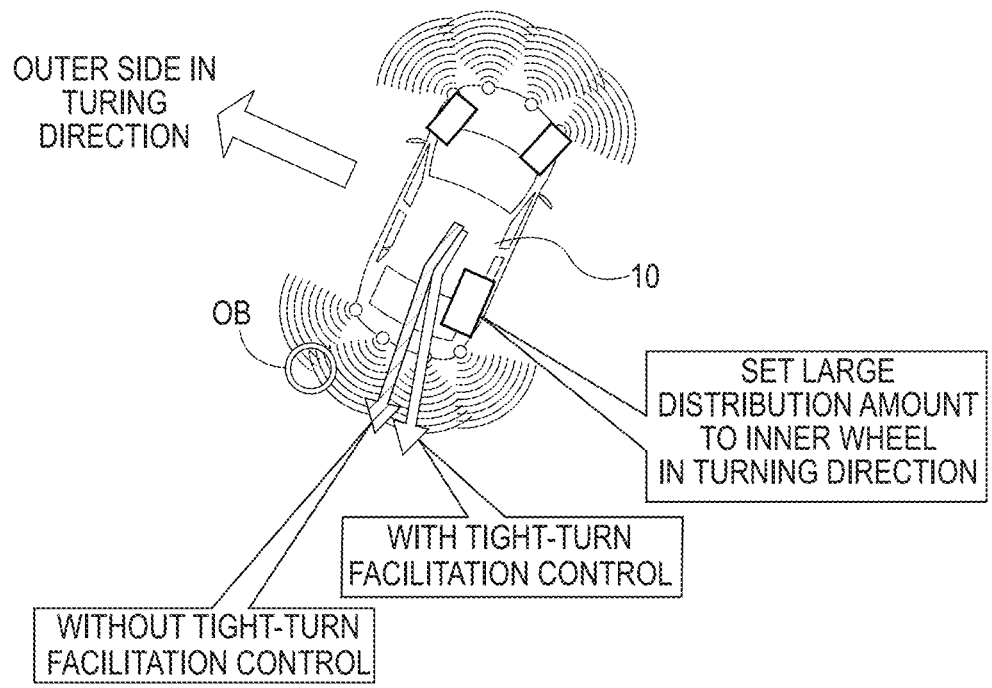
FIG. 6B is a diagram for explaining an operation for vehicle backward driving in the vehicle control device according to the second embodiment.
Figure 7A:
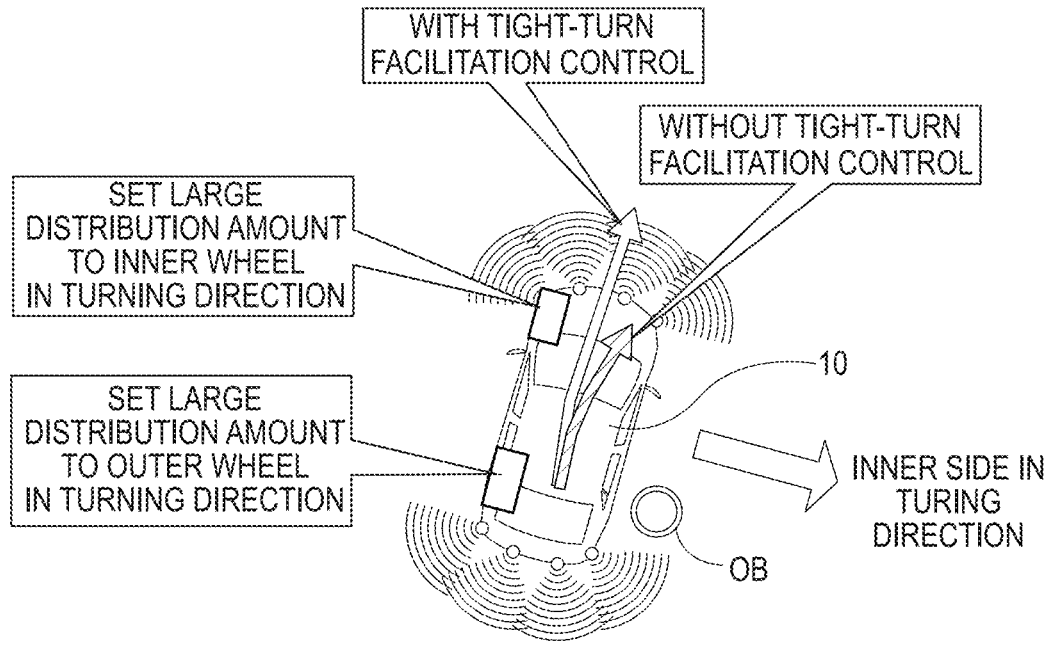
FIG. 7A is a diagram for explaining an operation for vehicle forward driving in the vehicle control device according to the second embodiment.
Figure 7B:
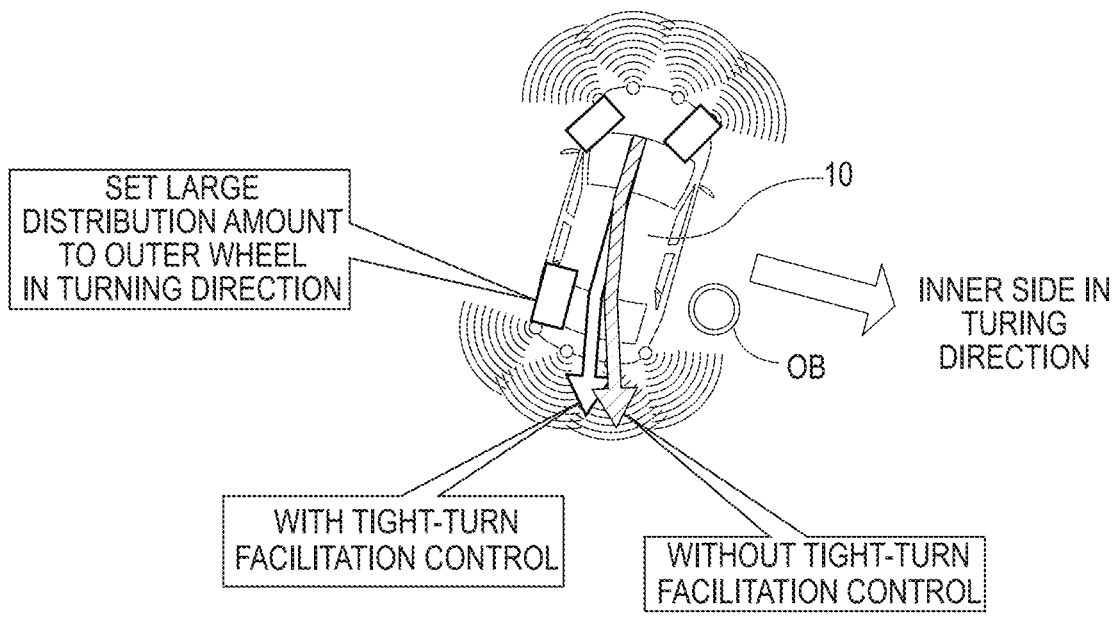
FIG. 7B is a diagram for explaining an operation for vehicle backward driving in the vehicle control device according to the second embodiment.

FIG. 6A is a diagram for explaining an operation for vehicle forward driving in the vehicle control device 11B according to the second embodiment. FIG. 6B is a diagram for explaining an operation for vehicle backward driving in the vehicle control device 11B according to the second embodiment. FIG. 7A is a diagram for explaining an operation for vehicle forward driving in the vehicle control device 11B according to the second embodiment. FIG. 7B is a diagram for explaining an operation for vehicle backward driving in the vehicle control device 11B according to the second embodiment.

In the vehicle control device 11B according to the second embodiment, the distribution amount setter 55 sets the distribution amount to zero when the steering angle SA is less than the first steering angle threshold (SA<|SAth|: see FIG. 2B) where the steering angle SA is recognizable as a substantially neutral state. In sum, when the steering angle SA is less than the first steering angle threshold, the distribution amount is zero. Here, the expression that the distribution amount is zero is a concept that includes both of a mode were a previously non-zero value is changed to zero and a mode where a previously zero value remains zero.

The distribution amount setter 55 sets the distribution amount to zero (consequently the distribution amount is zero) when the steering angle SA is less than the first steering angle threshold where the steering angle SA is recognizable as the substantially neutral state. Thus, even when slight correction steering, which may appear during straight driving, is performed, the vehicle control device 11B according to the second embodiment invalidates the correction steering and is prevented from executing the tight-turn facilitation control. As a result, an unexpected execution of the tight-turn facilitation control can be avoided.

In addition, even during execution of the tight-turn facilitation control of the specific wheel in order to facilitate a tight turn of the vehicle 10, it is possible to minimize creeping noise as much as possible to create a comfort driving environment, thereby contributing to a development of a sustainable transport system.

In particular, when the vehicle speed VS is within the low vehicle speed range, the first steering angle threshold (|SAth|) is variably set to a smaller value as the vehicle speed VS becomes lower (see FIG. 2C).

Thus, in a case where slight steering is performed under a relatively low vehicle speed VS, the vehicle control device 11B according to the second embodiment can utilize the slight steering for the tight-turn facilitation control, even though the presence of the slight steering may be ignored under a relatively high vehicle speed VS.

The vehicle control device 11B according to the second embodiment is capable of executing the tight-turn facilitation control with the vehicle speed VS and the steering angle SA taken into consideration as appropriate, thereby minimizing creeping noise as much as possible to create a comfort driving environment, and thus contributing to a development of a sustainable transport system.

Moreover, the distribution amount setter 55 sets the distribution amounts of the brake force to the respective multiple wheels provided in the vehicle 10 based on the driving conditions of the vehicle 10 (the vehicle speed VS and the steering angle SA) and the obstacle distribution OD. In particular, when an obstacle OB exists around the vehicle 10, the distribution amount setter 55 sets the distribution amounts such that a collision with the obstacle OB can be avoided.

Since when an obstacle OB exists around the vehicle 10, the distribution amount setter 55 sets the distribution amounts such that a collision with the obstacle OB can be avoided, the vehicle control device 11B according to the second embodiment is capable of obtaining the effect of avoiding a collision with the obstacle OB in addition to the effect of executing the suitable tight-turn facilitation control while minimizing creeping noise as much as possible.

In addition, when an obstacle OB exists around the vehicle 10, the distribution amount setter 55 evaluates a risk of collision with the obstacle OB based on a turning direction of the vehicle 10, an existence direction of the obstacle OB relative to the vehicle 10, the separation distance BG between the vehicle 10 and the obstacle OB, and sets the distribution amounts based on the evaluation result of the risk of collision such that the risk of collision can be reduced.

Since when an obstacle OB exists around the vehicle 10, the distribution amount setter 55 evaluates the risk of collision with the obstacle OB and sets the distribution amounts based on the evaluation result of the risk of collision such that the risk of collision can be reduced, the vehicle control device 11B according to the second embodiment is capable of further enhancing the effect of avoiding a collision with the obstacle OB in addition to the effect of executing the suitable tight-turn facilitation control while minimizing creeping noise as much as possible.

Further, when an obstacle OB exists around the vehicle 10, as the separation distance BD between the vehicle 10 and the obstacle OB becomes smaller (see FIG. 4B), the distribution amount setter 55 recognizes that the risk of collision is higher and sets the larger distribution amounts such that the risk of collision can be reduced.

Since when an obstacle OB exists around the vehicle 10, as the separation distance BD between the vehicle 10 and the obstacle OB becomes smaller (see FIG. 4B), the distribution amount setter 55 recognizes that the risk of collision is higher and sets the larger distribution amounts such that the risk of collision can be reduced, the vehicle control device 11B according to the second embodiment is capable of further enhancing the effect of avoiding a collision with the obstacle OB in addition to the effect of executing the suitable tight-turn facilitation control while minimizing creeping noise as much as possible.

Furthermore, as shown in FIGS. 6A and 6B, when an obstacle OB exists on one side of the vehicle 10 and the one side of the vehicle 10 coincides with the outer side in a turning direction of the vehicle 10 and if the risk of collision will be reduced with setting of the large distribution amounts for the inner wheels in the turning direction of the vehicle 10, the distribution amount setter 55 sets the large distribution amounts for the inner wheels in the turning direction of the vehicle 10 such that the risk of collision can be reduced.

Since when an obstacle OB exists on one side of the vehicle 10 and the one side of the vehicle 10 coincides with the outer side in a turning direction of the vehicle 10 and if the risk of collision will be reduced with setting of the large distribution amounts for the inner wheels in the turning direction of the vehicle 10, the distribution amount setter 55 sets the large distribution amounts for the inner wheels in the turning direction of the vehicle 10 such that the risk of collision can be reduced, the vehicle control device 11B according to the second embodiment is capable of adequately obtaining the effect of avoiding a collision with the obstacle OB in addition to the effect of executing the suitable tight-turn facilitation control while minimizing creeping noise as much as possible.

Moreover, as shown in FIGS. 7A and 7B, when an obstacle OB exists on one side of the vehicle 10 and the one side of the vehicle 10 coincides with the inner side in a turning direction of the vehicle 10 and if the risk of collision will be increased with setting of the large distribution amounts for the inner wheels in the turning direction of the vehicle 10, the distribution amount setter 55 sets the large distribution amounts for the outer wheels in the turning direction of the vehicle 10 such that the risk of collision can be reduced.

Since when an obstacle OB exists on one side of the vehicle 10 and the one side of the vehicle 10 coincides with the inner side in a turning direction of the vehicle 10 and if the risk of collision will be increased with setting of the large distribution amounts for the inner wheels in the turning direction of the vehicle 10, the distribution amount setter 55 sets the large distribution amounts for the outer wheels in the turning direction of the vehicle 10 such that the risk of collision can be reduced, the vehicle control device 11B according to the second embodiment is capable of adequately obtaining the effect of avoiding a collision with the obstacle OB in addition to the effect of executing the suitable tight-turn facilitation control while minimizing creeping noise as much as possible.

Other Embodiments

The several embodiments described above merely represent embodied examples of the present invention. Therefore, the technical scope of the present invention should not be interpreted by being limited to these embodiments. The present invention may be carried out in various modes without departing from the gist or main features of the present invention.

For example, the embodiments of the present invention are described by using the example in which the vehicle control device 11 according to the embodiment of the present invention is applied to the vehicle equipped with the internal combustion engine as a power source, but the present invention is not limited to this example. The present invention may be applied to an electric vehicle equipped with a motor generator as a power source, a hybrid vehicle equipped with an internal combustion engine and a motor generator as power sources, and the like.

What is claimed is:

1. A vehicle control device comprising:
   an information acquirer that acquires information on driving conditions of a vehicle at least containing a steering angle of a steering wheel and a vehicle speed;
   a distribution amount setter that sets a distribution amount of a brake force to each of a plurality of wheels provided in the vehicle based on the driving conditions of the vehicle; and
   a brake controller that performs brake control of each of the plurality of wheels according to the distribution amount set by the distribution amount setter,
   wherein
   when the steering angle is less than a first steering angle threshold where the steering angle is recognizable as a substantially neutral state, the distribution amount setter sets the distribution amount to zero, and
   when the vehicle speed is below a vehicle speed threshold serving as an upper limit of a low vehicle speed range, the first steering angle threshold is variably set to a value that becomes smaller as the vehicle speed becomes lower.

2. A vehicle control device comprising:
   an information acquirer that acquires information on driving conditions of a vehicle at least containing a steering angle of a steering wheel and a vehicle speed and information on a distribution of an obstacle existing around the vehicle;

a distribution amount setter that sets a distribution amount of a brake force to each of a plurality of wheels provided in the vehicle based on the driving conditions of the vehicle and the distribution of the obstacle; and a brake controller that performs brake control of each of the plurality of wheels according to the distribution amount set by the distribution amount setter, wherein when the obstacle exists around the vehicle, the distribution amount setter sets the distribution amount to be larger than when the obstacle does not exist around vehicle, and when the obstacle exists on one side of the vehicle and the one side coincides with an outer side in a turning direction of the vehicle, the distribution amount setter sets the distribution amount for inner wheels in the turning direction of the vehicle to be larger than for outer wheels in the turning direction of the vehicle.

3. The vehicle control device according to claim 2, wherein when the obstacle exists around the vehicle, the distribution amount setter evaluates a risk of collision with the obstacle based on the turning direction of the vehicle, an existence direction of the obstacle, and a separation distance between the vehicle and the obstacle, and sets the distribution amount based on an evaluation result of the risk of collision such that the risk of collision is reduced.

4. The vehicle control device according to claim 2, wherein when the obstacle exists around the vehicle, the distribution amount setter sets the distribution amount of the brake force to each of the plurality of wheels to be larger as a separation distance between the vehicle and the obstacle becomes smaller.

5. A vehicle control device comprising:

an information acquirer that acquires information on driving conditions of a vehicle at least containing a steering angle of a steering wheel and a vehicle speed and information on a distribution of an obstacle existing around the vehicle;

a distribution amount setter that sets a distribution amount of a brake force to each of a plurality of wheels provided in the vehicle based on the driving conditions of the vehicle and the distribution of the obstacle; and a brake controller that performs brake control of each of the plurality of wheels according to the distribution amount set by the distribution amount setter, wherein when the obstacle exists around the vehicle, the distribution amount setter sets the distribution amount to be larger than when the obstacle does not exist around vehicle, and when the obstacle exists on one side of the vehicle and the one side coincides with an inner side in a turning direction of the vehicle, the distribution amount setter sets the distribution amount for outer wheels in the turning direction of the vehicle to be larger than for inner wheels in the turning direction of the vehicle.

6. The vehicle control device according to claim 5, wherein when the obstacle exists around the vehicle, the distribution amount setter evaluates a risk of collision with the obstacle based on the turning direction of the vehicle, an existence direction of the obstacle, and a separation distance between the vehicle and the obstacle, and sets the distribution amount based on an evaluation result of the risk of collision such that the risk of collision is reduced.

7. The vehicle control device according to claim 5, wherein when the obstacle exists around the vehicle, the distribution amount setter sets the distribution amount of the brake force to each of the plurality of wheels to be larger as a separation distance between the vehicle and the obstacle becomes smaller.

* * * * *